(12) United States Patent
Jaksic et al.

(10) Patent No.: US 7,823,719 B2
(45) Date of Patent: Nov. 2, 2010

(54) ROLLER FOR A ROLLER CONVEYOR

(75) Inventors: Davorin Jaksic, Denzlingen (DE); Michael Klein, Waldkirch (DE)

(73) Assignee: Sick AG, Waldkirch (DE)

( * ) Notice: Subject to any disclaimer, the term of this patent is extended or adjusted under 35 U.S.C. 154(b) by 59 days.

(21) Appl. No.: 11/905,899

(22) Filed: Oct. 5, 2007

(65) Prior Publication Data

US 2008/0099309 A1 May 1, 2008

(30) Foreign Application Priority Data

Oct. 10, 2006 (DE) .................. 10 2006 048 145

(51) Int. Cl.
 *B65G 13/02* (2006.01)
 *B65G 13/06* (2006.01)
(52) U.S. Cl. .................. 198/781.05; 198/781.06
(58) Field of Classification Search ............ 198/781.05, 198/781.04
See application file for complete search history.

(56) References Cited

U.S. PATENT DOCUMENTS

| | | | | |
|---|---|---|---|---|
| 3,012,652 A | * | 12/1961 | Poel et al. ............... | 198/781.09 |
| 4,013,161 A | * | 3/1977 | Nelson ................... | 198/781.05 |
| 5,582,286 A | * | 12/1996 | Kalm et al. ............. | 198/781.06 |
| 7,290,649 B2 | * | 11/2007 | Wolkerstorfer ......... | 198/781.05 |
| 2002/0008007 A1 | * | 1/2002 | Thomas et al. .............. | 198/790 |
| 2004/0051878 A1 | * | 3/2004 | Rhoads ........................ | 356/521 |
| 2004/0051879 A1 | * | 3/2004 | Schick ........................ | 356/601 |
| 2004/0173440 A1 | * | 9/2004 | Mauch et al. .......... | 198/781.05 |

FOREIGN PATENT DOCUMENTS

| | | |
|---|---|---|
| DE | 33 46 347 A1 | 7/1985 |
| DE | 101 31 019 A1 | 12/2002 |
| EP | 0 953 524 A2 | 11/1999 |

* cited by examiner

*Primary Examiner*—Gene Crawford
*Assistant Examiner*—Kavel P Singh
(74) *Attorney, Agent, or Firm*—The Nath Law Group; Jerald L. Meyer; Stanley N. Protigal

(57) ABSTRACT

The invention relates to a roller (10') for a roller conveyor, having an outer cylinder (12') that is rotatably mounted on a stationary shaft (14') and which may be driven by a motor (16), the roller (10') having an optoelectronic sensor system (20') comprising a light transmitter (22') and a light receiver (24'). The optoelectronic sensor system (20') is positioned relative to the outer cylinder (12') in such a way that a light beam (22a') emitted by the light transmitter (22') extends along the exterior of the outer cylinder (12'), essentially parallel to a surface line of the outer cylinder (12'), and the light transmitter (22) is provided inside the outer cylinder (12'), and optical deflection means are provided for guiding the light beam (22a'), emitted by the light transmitter (22'), to the exterior of the outer cylinder (12').

10 Claims, 2 Drawing Sheets

ROLLER FOR A ROLLER CONVEYOR

The invention relates to a roller for a roller conveyor having the features of the preamble of claim 1.

Roller conveyors are known which comprise multiple adjacent rollers having an outer cylinder that is rotatably mounted on a stationary shaft. The known roller conveyors often have both active and inactive rollers, the active rollers being drivable via a motor, and the inactive rollers being merely connected to active rollers via corresponding belts, or rotating only when conveyed material slides over them.

In the known roller conveyors, for controlling the material flow the presence of the conveyed material, such as boxes or packages, for example, must be detected at certain positions on the conveyor line. It is known to install optoelectronic sensor systems, such as magnetic or inductive sensors, at the desired location on the conveyor line for detection of the conveyed material. These sensors are mounted, independently of the conveyor line, at the appropriate location on the conveyor line and are separately connected to corresponding supply lines for supplying power, or to corresponding data transmission lines for transmitting control signals or for transmitting data detected by the sensors to a control unit. For this purpose, these sensors must be mounted in a complex process, using a suitable fastening technique, at the corresponding location on the conveyor line.

Such an installation entails high costs and corresponding expenditure of effort.

The object of the invention, therefore, is to eliminate the disadvantages of known roller conveyors, and in particular to provide a roller for a roller conveyor which may be economically manufactured and installed. A particular aim is to provide simplified and more economical installation of monitoring sensors, in particular optoelectronic sensor systems.

The object of the invention is achieved by means of a roller for a roller conveyor having the features of claim 1.

Advantageous embodiments and refinements of the invention are stated in the subclaims.

The invention is based on the fact that the optoelectronic sensor system is integrated into the roller for a roller conveyor. The optoelectronic sensor system, having a light transmitter and a light receiver, is provided on the roller in such a manner that the roller is positioned relative to the outer cylinder in such a way that a light beam emitted by the light transmitter extends along the exterior of the outer cylinder, essentially parallel to a surface line of the outer cylinder. When the driven roller rotates and an object to be detected is placed on the roller, the emitted light beam from the optoelectronic sensor system detects the conveyed material at least once per revolution, thus allowing the presence of the conveyed material to be detected. Separate installation of the optoelectronic sensor system at a corresponding location on the conveyor line is omitted, since the optoelectronic sensor system is integrated into the roller.

According to the invention, the light transmitter is provided inside the outer cylinder. This results in a much more compact roller design, since use may be made of the interior of the outer cylinder, which generally is designed as a hollow cylinder, without increasing the outer dimensions of the roller. Optical deflection means are provided for guiding the light beam, emitted by the light transmitter, from the interior of the outer cylinder to the exterior of the outer cylinder. Mirrors or optical fibers represent examples of such optical deflection means.

In one particularly preferred embodiment of the invention, the additional cabling together with supply lines or data transmission lines is also omitted, since the supply lines and/or data transmission lines present for the motor, by means of which the motor is connected to a control unit, are also used for supply and/or data transmission for the optoelectronic sensor system.

The optoelectronic sensor system may be designed as a photoelectric barrier, light sensor, or reflective photoelectric barrier. For a photoelectric barrier the outer cylinder is situated between the light transmitter and the light receiver of the optoelectronic sensor system, so that the light emitted by the light transmitter directly strikes the light receiver and is possibly interrupted by the conveyed material. For a light sensor or a reflective photoelectric barrier the light transmitter and the light receiver are provided in proximity to one side of the outer cylinder, the light beam emitted by the light transmitter being reflected onto either the conveyed material or the reflector in the light receiver on the other side of the outer cylinder. The system in the form of a reflective photoelectric barrier is particularly advantageous, since in this design the conveyed material unambiguously interrupts the light beam. In particular, the roller may thus have a much more compact design, since the light transmitter and light receiver are situated in close proximity to one another, and it is not necessary to guide the corresponding supply lines on both sides of the outer cylinder of the roller in order to connect the light transmitter and the light receiver to the supply lines and/or data transmission lines.

In one particularly preferred embodiment of the invention, the light transmitter is provided on the shaft. Since the shaft is stationary while the outer cylinder rotates about the shaft, when the light transmitter is mounted on the outer cylinder it is also necessary to design the corresponding supply lines and/or data transmission lines in such a way that the optoelectronic sensor system is able to rotate. When the light transmitter is mounted on the stationary shaft, the connection to the supply lines and/or data transmission lines is greatly simplified.

If the light transmitter is mounted on the shaft and only one optical deflection means is provided at a point on the outer circumference of the outer cylinder for guiding light from the interior of the outer cylinder to the exterior of the outer cylinder, the light beam which monitors the exterior of the outer cylinder for the presence of the conveyed material is pulsed at the rotational frequency of the outer cylinder. However, the time intervals between the individual light pulses may be too long to reliably detect conveyed material moved via the roller. For this reason, it is preferable to distribute multiple optical deflection means over the circumference of the outer cylinder for guiding the light beam, emitted by the light transmitter, from the interior of the outer cylinder to the exterior of the outer cylinder. The frequency of the pulsed light beam on the exterior of the outer cylinder is thus increased by a multiple.

To allow a continuous light beam to be provided and thus improve the detection of the presence of the conveyed material, in one particularly preferred embodiment of the invention the optical deflection means is designed as a ring made of a light-conducting material, the ring enclosing the edge of the outer cylinder. The light-conducting ring guides the light from the interior of the outer cylinder to the exterior of the outer cylinder. However, in this case the deflection of the light beam emitted by the light transmitter is independent of the position of the outer cylinder relative to the stationary shaft, thus providing a continuous light beam on the exterior of the outer cylinder.

The outer cylinder is preferably driven via a driver that is actuated by the motor, the driver preferably being connected to the outer cylinder via a loop coupling or slide coupling.

This ensures that even in the event of motor malfunction the outer cylinder may still be rotated, if necessary, without damaging the motor, or, for a stationary outer cylinder, without damaging the motor which continues to rotate.

The roller according to the invention is used in particular in a roller conveyor in order to use the optoelectronic sensor systems situated along the roller conveyor. Assembly of such a roller conveyor is thus greatly simplified and much more economical.

The invention is explained in detail with reference to the figures, which show the following:

Figure 1:
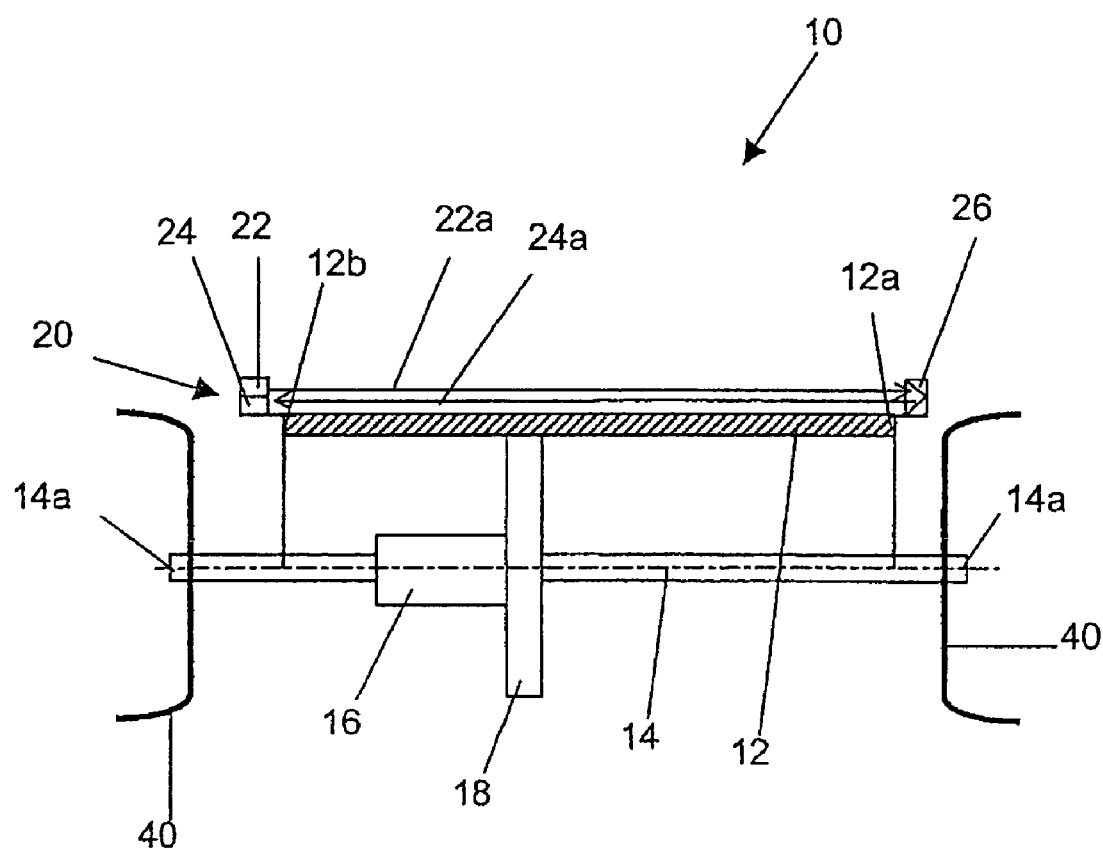
FIG. 1 shows a schematic illustration of one exemplary embodiment of a roller.

FIG. 1 shows a schematic illustration of a roller 10 having an outer cylinder 12 which is essentially designed as a hollow cylinder having an edge 12a and an edge 12b. Passing through the outer cylinder 12 is a shaft 14 having a journal 14a at each free end by means of which the shaft 14 may be attached to a conveyor stand 40. The conveyor stand 40 is illustrated in a purely schematic manner. The shaft 14 is stationary with respect to the conveyor stand 40. Mounted on the shaft 14 is a motor 16 which drives a driver 18, designed as a disk, on the outer circumference of which the outer cylinder 12 is provided. The driver 18 is connected to the outer cylinder 12 by means of a loop coupling or a slide coupling, for example. When the motor 16 rotates the driver 18, this causes the outer cylinder 12 to rotate about the shaft 14.

A sensor system 20 is integrated into the roller 10. The sensor system 20 has a light transmitter 22, a light receiver 24, and a reflector 26. The sensor system 20 is designed as a reflective photoelectric barrier, the light transmitter 22 and the light receiver 24 being situated in close proximity to one another, for example in a housing. The sensor system 20 is integrated into the roller 10 by providing the light transmitter 22 and the light receiver 24 in proximity to the edge 12b of the outer cylinder 12, fixed to the outer cylinder 12 in the exterior region of the outer cylinder 12. The sensor system 20 is aligned in such a way that a light beam 22a emitted by the light transmitter 22 extends parallel to a surface line of the outer cylinder 12 along the exterior of the outer cylinder 12, thus allowing material conveyed on the roller 10 to be detected. The reflector 26 is also fixedly connected to the outer cylinder 12 at the edge 12b thereof, situated opposite from the light transmitter 22. The light 22a emitted by the light transmitter 22 strikes the reflector 26, and from there is reflected in a light beam 24a which is detected by the light receiver 24. Alternatively, the reflector 26 may be provided on the stationary shaft 14.

In the present exemplary embodiment, in principle the light receiver 24 may also be placed at the location of the reflector 26, so that the sensor system 20 forms a one-way photoelectric barrier.

In the embodiment illustrated in FIG. 1, the sensor system 20 is located on the exterior of the outer cylinder 12, thereby increasing the outer dimensions of the roller 10.

Figure 2:
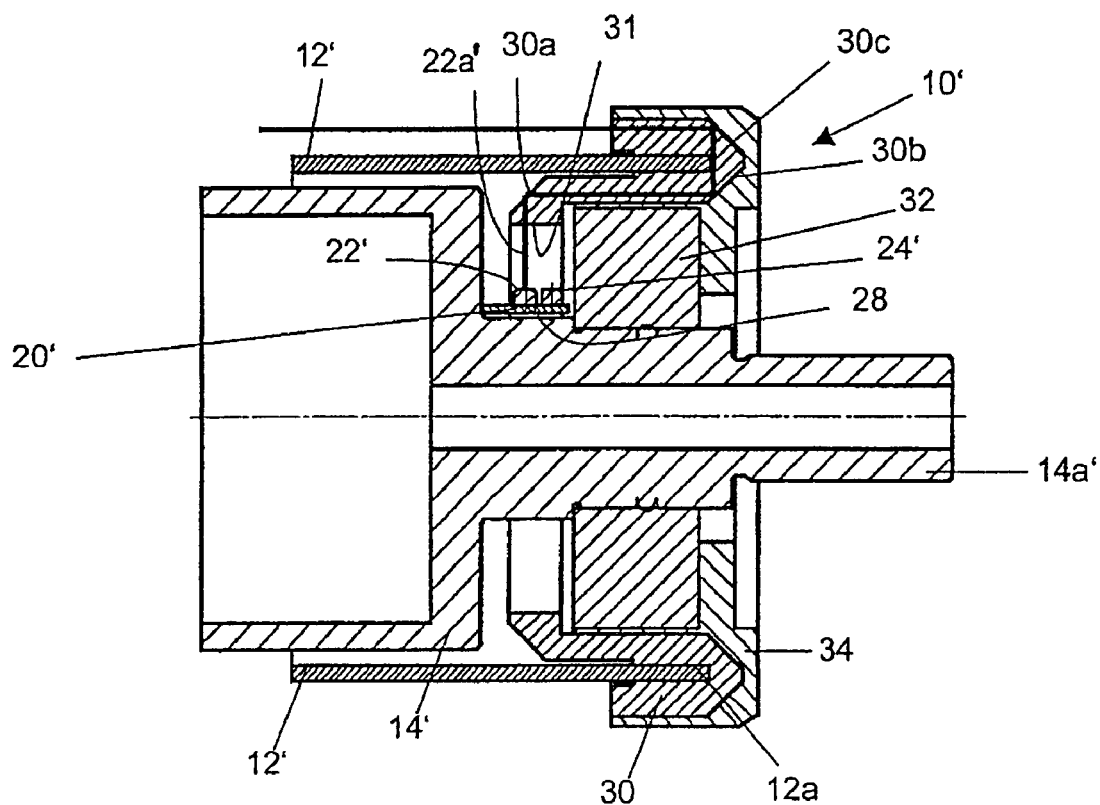
FIG. 2 shows an axial section of a further exemplary embodiment of a roller.
Figure 3:
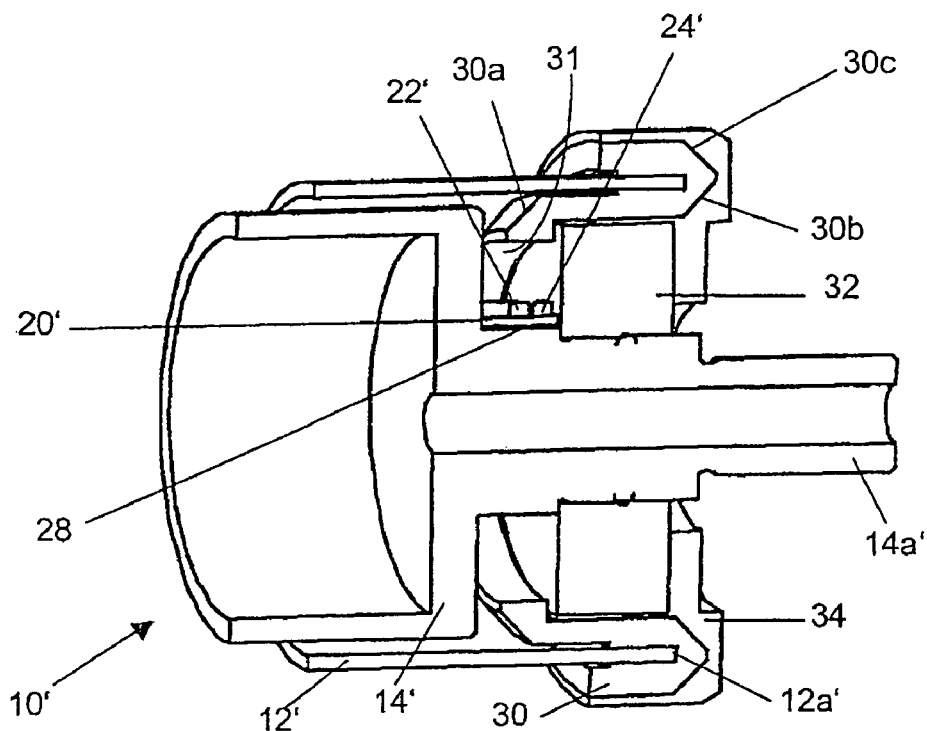
FIG. 3 shows a partial cutaway perspective view of the exemplary embodiment according to FIG. 2.

FIGS. 2 and 3 illustrate a further exemplary embodiment of a roller 10' having a hollow cylindrical outer cylinder 12' which is only partially illustrated, in particular only one edge 12a' being shown in the figures. The outer cylinder 12' is rotatably mounted on a shaft 14', whereby the shaft 14' may be mounted on a conveyor stand (not illustrated) by means of a journal 14a'. The outer cylinder 12' is driven with respect to the shaft 14' in a manner similar to the exemplary embodiment illustrated in FIG. 1, via a motor and associated driver (not illustrated).

In the exemplary embodiments illustrated in FIGS. 2 and 3, a sensor system 20' is provided in the interior of the outer cylinder 12' on the stationary shaft 14'. The sensor system 20' has a light transmitter 22' and a light receiver 24' as well as an electronic card 28. The sensor system 20' is aligned in such a way that a light beam 22a' emitted by the light transmitter 22' extends radially with respect to the shaft 14' and at right angles to the cylinder wall of the outer cylinder 12'.

Various optical deflection means may be present for guiding the light beam 22a' emitted by the light transmitter 22' to the exterior of the outer cylinder 12'. In the present case, the roller 10' has a light-conducting ring 30 which encloses the edge 12a' of the outer cylinder 12. The edge 12a' of the outer cylinder 12' is thus supported in the light-conducting ring 30. The light-conducting ring 30 has three deflecting surfaces 30a, 30b, 30c by means of which the light beam 22a' emitted by the light transmitter 22' is guided from the interior of the outer cylinder 12' to the exterior of the outer cylinder 12'. The light-conducting ring 30 has, firstly, an incident surface 31 which runs perpendicular to the light beam 22a' emitted by the light transmitter 22', thereby essentially forming a hollow cylindrical surface around the shaft 14'. After passing through the incident surface 31 the emitted light beam 22a' strikes the first deflecting surface 30a, which is inclined at an angle of 45° relative to the emitted light beam 22a', and the emitted light beam 22a' is deflected by 90° so that it is guided parallel to the inner surface of the outer cylinder 12' in the direction of the edge 12a'. Behind the edge 12a', as viewed from the light beam 22a' deflected in this manner, the second deflecting surface 30b is once again inclined at an angle of 45° relative to the corresponding light beam, so that the light beam is deflected by 90° at the second deflecting surface 30b and is then guided radially with respect to the shaft 14, from the interior region of the outer cylinder 12' into the exterior region of the outer cylinder 12'. At that location the light beam strikes the third deflecting surface 30c, which once again is inclined at an angle of 45° relative to the light beam, so that the light beam once again is deflected by 90° and then runs parallel to a surface line of the outer cylinder 12'. The corresponding deflecting surfaces 30a, 30b, 30c may be formed by appropriate shaping of the light-conducting ring 30. Alternatively, the corresponding deflecting surfaces 30a, 30b, 30c may be made of highly reflective or mirrored surfaces instead of light-conducting material. However, the design of the deflecting surfaces 30a, 30b, 30c as a ring 30 of light-conducting material is preferred, since the light-conducting ring 30 stabilizes the edge 12a' of the outer cylinder 12', and in addition may be designed in a particularly economical manner as a one-piece ring in the injection molding process.

If the light transmitter 22' then emits a light beam 22a', in principle the emitted light beam is guided through the light-conducting ring 30 on the exterior of the outer cylinder 12', independently of the position of the outer cylinder 12' relative to the shaft 14', so that a continuous light beam is provided on the exterior of the outer cylinder 12' for monitoring the material conveyed by the roller 10'. The outer dimensions of the roller 10' are not changed as the result of incorporating the sensor system 20'.

In the present case, the light receiver 24 is provided on the electronic card 28 in proximity to the light transmitter 22', so that, on the other side of the outer cylinder 12' in the region of the edge (not illustrated), a reflector in turn is either fixedly connected to the outer cylinder 12' or is fixedly connected to the shaft 14' in order to reflect the emitted light beam 22a' and to reflect the light beam along the same light path of the emitted light beam 22a', back to the light receiver 24'. A reflector provided on the outer cylinder 12' is preferably designed in the form of a ring in order to be able to reflect the emitted light beam 22a' in any position of the outer cylinder 12' relative to the shaft 14'.

In principle, however, it is also possible to provide the light receiver 24' on the other side of the outer cylinder 12', and at that location to either mount the light receiver 24' on the outer cylinder 12', as described in the exemplary embodiments illustrated in FIG. 1, or to mount the light receiver 24' on the stationary shaft 14' and provide corresponding optical deflection means for deflecting the emitted light beam 22a' from the exterior of the outer cylinder 12' into the interior of the outer cylinder 12'.

The light-conducting ring 30 is rotatably supported with respect to the shaft 14' on a bearing 32. In particular, the light-conducting ring 30 is countersunk in an end cap 34 which closes off the end face of the outer cylinder 12' from the outside in the region of the edge 12a' to prevent dirt from penetrating into the interior of the roller 10'.

In principle, other possibilities are conceivable for guiding the light from the interior of the outer cylinder 12' to the exterior of the outer cylinder 12'. For example, multiple optical fibers may be distributed along the circumference of the edge 12a' which at one end capture the light beam 22a', emitted by the light transmitter 22a', inside the outer cylinder 12' and guide the light to the exterior of the outer cylinder 12'. However, instead of continuous light a pulsed light beam is provided, the pulse frequency of which is several times the rotational frequency of the outer cylinder, depending on the number of optical fibers or some other optical deflection means.

Since the light paths are deflectable, in principle it is possible to use each of the described possibilities for deflecting the light beam 22a, 22a' emitted by the light transmitter 22, 22' to the exterior of the outer cylinder 12, 12', and also for the light receiver 24, 24', and, if present, the reflector 26, in which case it is not necessary for the light transmitter 22, 22' and the light receiver 24, 24' or the reflector 26 to have the same geometries or configurations.

| List of reference numerals | |
| --- | --- |
| 10 | Roller |
| 10' | Roller |
| 12 | Outer cylinder |
| 12' | Outer cylinder |
| 12a | Edge |
| 12a' | Edge |
| 12b | Edge |
| 14 | Shaft |
| 14' | Shaft |
| 14a | Journal |
| 14a' | Journal |
| 16 | Motor |
| 18 | Driver |
| 20 | Sensor system |
| 20' | Sensor system |
| 22 | Light transmitter |
| 22' | Light transmitter |
| 22a | Emitted light beam |
| 22a' | Emitted light beam |
| 24 | Light receiver |
| 24' | Light receiver |
| 24a | Reflected light beam |
| 26 | Reflector |
| 28 | Electronic card |
| 30 | Light-conducting ring |
| 30a | Deflecting surface |
| 30b | Deflecting surface |
| 30c | Deflecting surface |
| 31 | Incident surface |
| 32 | Bearing |
| 34 | End cap |
| 40 | Conveyor stand |

The invention claimed is:

1. Roller for a roller conveyor, having an outer cylinder that is rotatably mounted on a stationary shaft and which may be driven by a motor, the roller having an optoelectronic sensor system comprising a light transmitter and a light receiver, characterized in that the optoelectronic sensor system is positioned relative to the outer cylinder in such a way that a light beam emitted by the light transmitter extends along the exterior of the outer cylinder, essentially parallel to a surface line of the outer cylinder, and the light transmitter is provided inside the outer cylinder, and optical deflection means are provided for guiding the light beam, emitted by the light transmitter, to the exterior of the outer cylinder.

2. Roller according to claim 1,
characterized in that the motor is connected to a control unit via supply lines and/or data transmission lines by means of which the supply and/or data transmission for the optoelectronic sensor system is performed.

3. Roller according to claim 1,
characterized in that the optoelectronic sensor system is designed as a reflective photoelectric barrier.

4. Roller according to claim 1,
characterized in that the light transmitter is provided on the shaft.

5. Roller according to claim 1,
characterized in that the optical deflection means are mirrors or optical fibers.

6. Roller according to claim 4,
characterized in that multiple optical deflection means for guiding the light beam emitted by the light transmitter are provided over the circumference of the outer cylinder on the exterior of the outer cylinder.

7. Roller according to claim 1,
characterized in that the optical deflection means is designed as a ring made of a light-conducting material, the ring enclosing an edge of the outer cylinder to guide the light beam emitted by the light transmitter from the interior of the outer cylinder to the exterior of the outer cylinder.

8. Roller according to claim 1,
characterized in that the motor has a driver by means of which the motor drives the outer cylinder.

9. Use of a roller according to claim 1 in a roller conveyor.

10. Roller according to claim 1,
characterized in that the motor has a driver by means of which the motor drives the outer cylinder, the driver being connected to the outer cylinder via a loop coupling or slide coupling.

* * * * *